US011958422B2

(12) United States Patent
Garg et al.

(10) Patent No.: US 11,958,422 B2
(45) Date of Patent: Apr. 16, 2024

(54) ROAD CONDITION REPORTER

(71) Applicant: T-Mobile USA, Inc., Bellevue, WA (US)

(72) Inventors: Parag Garg, Woodinville, WA (US); Dhruv Chadha, Kirkland, WA (US); Nicholas LaVassar, Issaquah, WA (US); Joseph Baird, Kent, WA (US); Mehdi Piraee, Bothell, WA (US); Evan Ingardia, Seattle, WA (US); Zohebulla Bangalore Sanaulla, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 340 days.

(21) Appl. No.: 17/164,734

(22) Filed: Feb. 1, 2021

(65) Prior Publication Data

US 2022/0242337 A1    Aug. 4, 2022

(51) Int. Cl.
| | |
|---|---|
| *B60R 16/023* | (2006.01) |
| *B60W 30/09* | (2012.01) |
| *B60W 30/095* | (2012.01) |
| *B60W 50/02* | (2012.01) |
| *G01C 21/34* | (2006.01) |
| *G01C 21/36* | (2006.01) |
| *G06Q 10/20* | (2023.01) |
| *G06Q 50/26* | (2012.01) |

(52) U.S. Cl.
CPC ......... *B60R 16/0231* (2013.01); *B60W 30/09* (2013.01); *B60W 30/0956* (2013.01); *B60W 50/0205* (2013.01); *G01C 21/3407* (2013.01); *G01C 21/3626* (2013.01); *G06Q 10/20* (2013.01); *G06Q 50/26* (2013.01); *B60W 2420/50* (2013.01); *B60W 2510/0638* (2013.01); *B60W 2510/0676* (2013.01); *B60W 2510/18* (2013.01); *B60W 2520/10* (2013.01); *B60W 2555/20* (2020.02)

(58) Field of Classification Search
None
See application file for complete search history.

(56) References Cited

U.S. PATENT DOCUMENTS

| | | | |
|---|---|---|---|
| 9,188,981 B2 | 11/2015 | Israelsson | |
| 9,587,952 B1 | 3/2017 | Slusar | |
| 9,669,839 B2 | 6/2017 | Wagner | |
| 9,827,991 B2 | 11/2017 | Pettersson | |
| 9,863,928 B1 | 1/2018 | Peterson et al. | |
| 10,440,709 B1 * | 10/2019 | Borst | H04W 72/0446 |
| 10,824,145 B1 | 11/2020 | Konrardy et al. | |

(Continued)

*Primary Examiner* — Christian Chace
*Assistant Examiner* — Scott R Jagolinzer

(57) ABSTRACT

Methods, systems, and apparatus, including computer programs encoded on a computer storage medium, for implementing a road condition reporter are disclosed. In one aspect, a method includes the actions of receiving, from a computing device, data that reflects characteristics of a vehicle. The actions further include, based on the data that reflects the characteristics of the vehicle, determining a characteristic of a road traveled by the vehicle. The actions further include, based on the characteristic of the road traveled by the vehicle, generating an instruction to perform an action. The actions further include providing, for output, the instruction to perform the action.

19 Claims, 5 Drawing Sheets

(56) References Cited

U.S. PATENT DOCUMENTS

| | | | |
|---|---|---|---|
| 2013/0325320 A1* | 12/2013 | Dimitriadis | G01C 21/3605 |
| | | | 701/414 |
| 2014/0309814 A1* | 10/2014 | Ricci | H04N 21/41422 |
| | | | 701/2 |
| 2015/0353008 A1* | 12/2015 | Kline | B60W 40/04 |
| | | | 340/993 |
| 2016/0071418 A1* | 3/2016 | Oshida | B60K 28/06 |
| | | | 701/23 |
| 2016/0189305 A1 | 6/2016 | Bogovich et al. | |
| 2018/0196443 A1* | 7/2018 | Bai | H04W 4/023 |
| 2019/0147260 A1* | 5/2019 | May | B60W 50/14 |
| | | | 382/103 |

* cited by examiner

ROAD CONDITION REPORTER

BACKGROUND

Roads can exhibit various defects such as potholes, cracking, and loose pavement. These defects may need to be repaired in order to prevent the road from further deteriorating. In some cases, these defects may cause damage to vehicles, such as a vehicle being damaged by passing over a pothole.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Maintaining a road provides benefits to both drivers and pedestrians. When driving on a road that is free of defects and obstacles, the driver can focus on driving safely without having to worry about avoiding potholes, rippling pavement, or any other similar defect. Road defects and obstacles in the road are inevitable, however. It would be beneficial to identify the locations of the various road defects and obstacles and alerts various parties to those defects and obstacles. An entity responsible for repairing defects and removing obstacles may benefit from a timely notification regarding the location of a defect or obstacle so that the entity may dispatch a repair crew. Additionally, computing devices that are configured to generate navigation directions may benefit from timely notification regarding the location of a defect or obstacle so that the computing device may generate instructions that avoid the location of the defect or obstacle.

In order to identify and locate a defect and/or obstacle in the road, it may be helpful to equip vehicles with a computing device that connects to the on-board diagnostic port. The computing device may include sensors that generate sensor data that reflects the motion of the computing device and the environment around the computing device. The computing device may also be able to receive vehicle data through the on-board diagnostic port. The vehicle data may include diagnostic data and reflect characteristics of the vehicle. The computing device may provide the sensor data and vehicle data to a server for analysis.

The server may analyze the vehicle data and the status data and determine whether the vehicle likely interacted with a road defect and/or obstacle or interacted with pavement that may not currently require any maintenance. If the road does not currently require any maintenance, then the server may bypass outputting data related to the condition of the road. If the road has a defect and/or obstacle, then the server may identify the entity responsible for repairing the defect and/or obstacle and transmit, to the entity, a repair instruction. Additionally, the server may provide, to other computing devices, a notification describing the defect and/or obstacle. Some of those notifications may include data identifying the defect and/or obstacle, a location of the defect and/or obstacle, and an instruction to avoid the location. The server may continue to analyze vehicle data and the status data received from computing devices in vehicles. If the server determines that the defect and/or obstacle has been corrected, then the server may generate and output an additional notification identifying the defect and/or obstacle, the location of the defect and/or obstacle, and data indicating that the defect and/or obstacle has been addressed.

Figure 1:
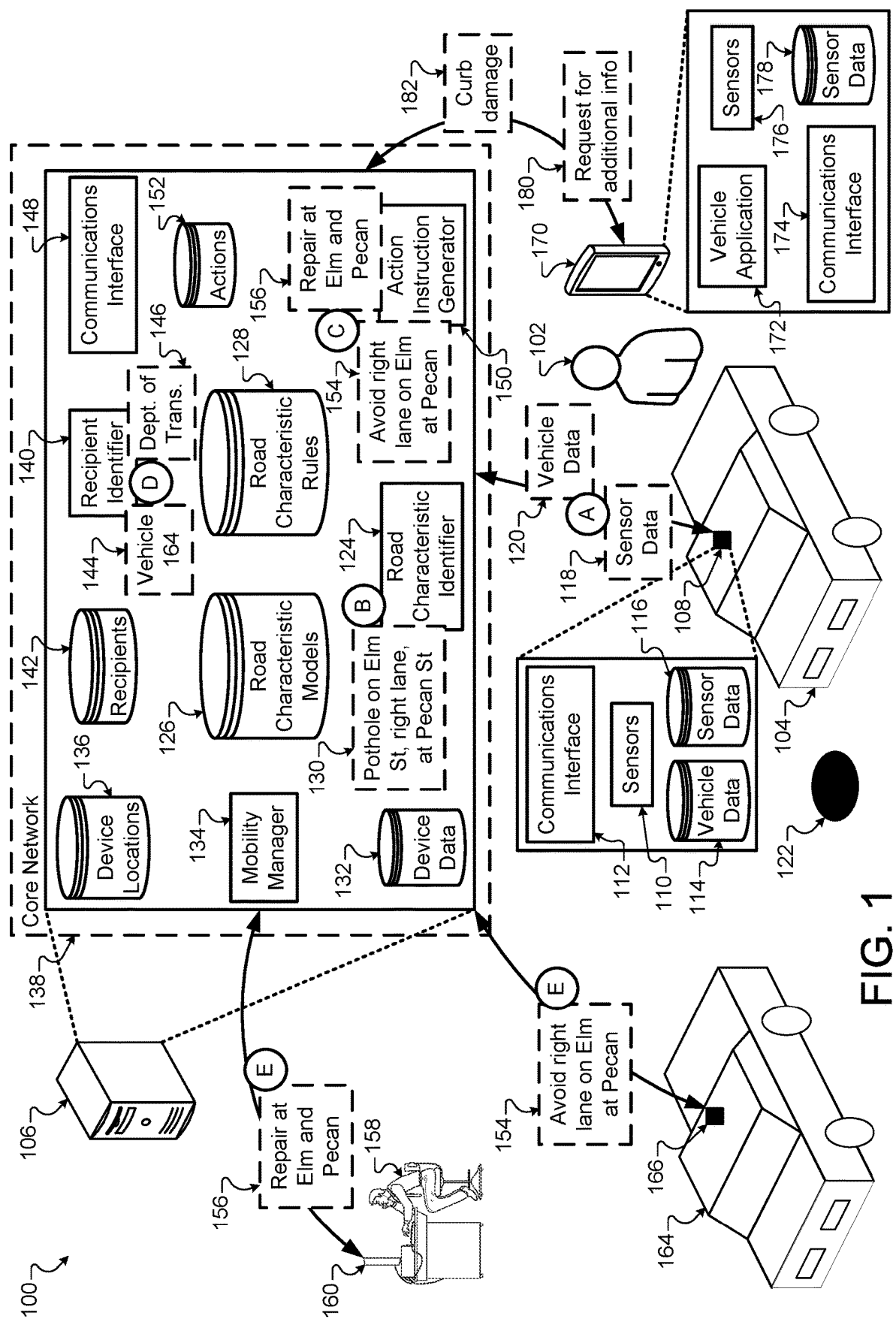
FIG. 1 illustrates an example system that is configured to detect the condition of a road and generate an instruction based on that condition.

FIG. 1 illustrates an example system 100 that is configured to detect the condition of a road and generate an instruction based on that condition. Briefly, and as described in more detail below, the system 100 includes a server 106 that is configured to communicate with a computing device 108 that is communicating with the vehicle 104. Based on the data received from the computing device 108, the server 106 may determine a condition of the road traveled by the vehicle 104. Based on the condition of the road, the server 106 may generate and output instructions for various entities and computing devices to perform. FIG. 1 includes various stages A through G that may illustrate the movement of data between the server 106 and other computing devices. The system 100 may perform these stages in any order.

The vehicle 104 may include a computing device 108 that receives vehicle data 114 through the on-board diagnostic port of the vehicle 104. For example, the computing device 108 may plug into the on-board diagnostic port and receive vehicle diagnostic data through the on-board diagnostic port. In some implementations, the computing device 108 may be integrated into the vehicle and receive vehicle diagnostic data from a computer of the vehicle 104 without connecting to the on-board diagnostic port. The computing device 108 may include various sensors 110 that are configured to detect the movement of the computing device 108, the location of the computing device 108, and/or the environment around the computing device 108. For example, the sensors 110 may include an accelerometer, a gyroscope, a GPS receiver, a barometer, an ambient light sensor, a camera, a compass, a gravity sensor, a proximity sensor, a magnetometer, a microphone and/or any other similar sensors.

The computing device 108 may store the data collected from the sensors 110 in the sensor data 116. The computing device 108 may store data from the sensors 110 in the sensor data 116 at periodic intervals, such as every ten seconds. The computing device 108 may store data from the sensors 110 while the vehicle is on, in motion, or moving at least at a threshold speed. The computing device 108 may receive or request the vehicle diagnostic data at periodic intervals, such as every ten seconds. The computing device 108 may receive or request the vehicle diagnostic data while the vehicle is on, in motion, or moving at least at a threshold speed. In some implementations, the computing device 108 may receive or request the vehicle diagnostic data at the same time that the computing device 108 generates and stores data from the sensors 110. The computing device 108 may be configured to store the most recent data in the vehicle data 114 and the sensor data 116. For example, the computing device 108 may store the most recent hour of data in the vehicle data 114 and the sensor data 116.

The computing device 108 may include a communications interface 112. The communications interface 112 may include communication components that enable the computing device 108 to transmit data and receive data from other devices. For example, the communications interface 112 may be able to receive and exchange data with the server 106. The communication interface 112 may include an interface that is configured to communicate with base stations of a wireless carrier network. In some implementations, the communication interface 112 may be configured to communicate over a wide area network, a local area network, the internet, a wired connection, a wireless connection, and/or any other type of network or connection. The wireless connections may include Wi-Fi, short-range radio, infrared, and/or any other wireless connection. In some implementations, the communication interface 112 may include an interface that is configured to connect to an on-board diagnostic port of the vehicle 104.

The communications interface 112 may periodically transmit the vehicle data 114 and the sensor data 116 to the server 106, such as every ten seconds. In some implementations, the communications interface 112 may transmit the vehicle data 114 and the sensor data 116 to the server 106 in response to a request from the server 106. In some implementations, the communications interface 112 may transmit the vehicle data 114 and the sensor data 116 to the server 106 based on detecting a change in the vehicle 102. For example, the communications interface 112 may transmit the vehicle data 114 and the sensor data 116 to the server 106 based on the acceleration of the vehicle being greater than a threshold, such as more than fifteen miles per hour per second which may occur if the speed of the vehicle 104 decreases at a rate of fifteen miles per hour in less than a second. As another example, the communications interface 112 may transmit the vehicle data 114 and the sensor data 116 to the server 106 in response to a change in the vehicle data 114 and the sensor data 116. For example, the computing device 108 may detect a change in the accelerometer data that is greater than a threshold. Based on detecting that change, the communications interface 112 may transmit the vehicle data 114 and the sensor data 116 to the server 106.

In stage A, the user 102 is driving the vehicle 104 and drives over a pothole 122 in the road. The sensors 110 may generate sensor data while the vehicle 104 is in motion. That sensor data may include accelerometer data that may indicate that the vehicle experienced a jolt as the vehicle 104 passed over the pothole. The computing device 108 may detect the jolt by comparing the accelerometer data to a threshold. If the accelerometer data satisfies a threshold, then the communications interface 112 may transmit the sensor data 118 and the vehicle data 120 to the server 106. For example, if the accelerometer data is twenty-five miles per hour per second and the threshold is twenty miles per hour per second, then the accelerometer data satisfies the threshold because twenty-five miles per hour per second is greater than twenty miles per hour per second. The sensor data 118 and the vehicle data 120 may include data stored in the vehicle data 114 and the sensor data 116. For example, the sensor data 118 and the vehicle data 120 may include the data stored in the previous ten minutes. In some instances, the communications interface 112 may automatically transmit the sensor data 118 and the vehicle data 120 to the server 106 at periodic intervals, such as every two minutes.

The server 106 may receive the sensor data 118 and the vehicle data 120 from the computing device 108 and store the sensor data 118 and the vehicle data 120 in the device data 132. In some implementations, sensor data 118 and the vehicle data 120 may include a unique device identifier that corresponds to the computing device 108. In some implementations, the sensor data 118 and the vehicle data 120 may include timestamp data that indicates the date and time that the sensors 110 generated the sensor data and the vehicle 104 generated or output the vehicle data. The server 106 may also store data received from other devices in the device data 132.

The server 106 may be included in or in communication with a network such as a wireless carrier network that provides voice and data communication services to multiple devices, such as the computing devices 108, 160, 166, and 170 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 108, 160, 166, and 170 and other devices using a Wi-Fi network, short range radio, infrared communication, and/or any other similar communication technique.

The wireless carrier network may include a radio access network and a core network 138. The radio access network may include multiple base stations. The multiple base stations are responsible for handling voice and/or data traffic between multiple devices, such as the computing devices 108, 160, 166, and 170 and other devices and the core network 138. Accordingly, each of the base stations may provide a corresponding network cell that delivers telecommunication and data communication coverage. The core network 138 may use the network cells to provide communication services to the multiple subscriber devices. For example, the core network 138 may connect the multiple devices to other telecommunication and data communication networks, such as the Internet and the public switched telephone network (PSTN). The base stations are responsible handling voice and data traffic between devices and the core network 138. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The server 106 includes a road characteristic identifier 124. The road characteristic identifier 124 may be configured to analyze the device data 132 that includes the sensor data 118 and vehicle data 120 received from devices such as the computing device 108 and determine a characteristic of the road. A characteristic of the road may include physical characteristics of the road, such as potholes, bumps, broken pavement, cracking, slippage cracks, depressions, ruts, ripples, upheaval, loose pavement, and any other similar characteristics. A characteristic may also include obstacles in the roads. These obstacles may include objects that remain stationary even after contacting a vehicle and objects that move after contacting a vehicle.

The road characteristic identifier 124 may analyze the device data 132 using the road characteristic models 126 and/or the road characteristic rules 128 to determine the characteristics of the road. The road characteristic rules 128 may specify how to compare the device data to determine the characteristics of the road. For example, a road characteristic rule may specify that if the data from the accelerometer indicates that acceleration in a direction perpendicular to the road is greater than a threshold and if, at approximately the same time, the tire pressure increases by at least twenty present and then returns to the previous tire pressure, then the road characteristic rule may indicate that a pothole is at the location where the computing device 108 collected that data. The road characteristic models 126 may be configured to receive the device data 132 and output data indicating the characteristic of the road. The road characteristic models 126 may be trained using machine learning and historical data that includes sensor data and vehicle data collected from vehicles before, during, and after the vehicles encountered the road characteristic. In some implementations, the road characteristic models 126 may output a confidence score that indicates a likelihood that the vehicle 102 encountered the road characteristic.

In some implementations, the road characteristic identifier 124 may crowdsource device data received from computing devices in different vehicles and collected at approximately the same location on a same day. The road characteristic identifier 124 may crowdsource data by analyzing the device data 132 received from multiple vehicles using the road characteristic models 126 and/or the road characteristic rules 128 and comparing the results. If device data collected from a majority of the vehicles, or another threshold percentage of the vehicles, that drove on the same road and on a same day indicates that the road has a certain characteristic, then the road characteristic identifier 124 may determine that the road has that characteristic.

In stage B, the road characteristic identifier 124 analyzes the device data 132 that includes the sensor data 118 and the vehicle data 120 using the road characteristic models 126 and/or the road characteristic rules 128. The road characteristic identifier 124 may provide the device data 132 as an input to the road characteristic models 126 and/or compare the device data 132 as specified by the road characteristic rules 128. The road characteristic identifier 124 may generate road characteristic 130 that indicates that there is a pothole in the right lane of Elm Street at Pecan Street. The road characteristic identifier 124 may use mapping data to determine the location of the road characteristic by comparing the location data included in the device data 132 to the mapping data.

The server 106 may include a mobility manager 134. The mobility manager 134 may be configured to monitor the location of a computing device that is connected to the server 106 through a wireless base station. The location of the computing device may include the location of the wireless base station to which the computing device is connected and/or GPS data received from the computing device. The mobility manager 134 may store the location data in the device locations 136 of the server 106.

In some implementations, the mobility manager 134 may determine the location of a computing device at periodic intervals, such as every five seconds. In some implementations, the mobility manager 134 may determine the location of a computing device when the computing device connects to a different wireless base station and/or provides updated GPS data. In some implementations, the mobility manager 134 may determine the location of the computing device relative to the base station with which the computing device is communicating. In this case, the mobility manager 134 may determine the relative location based on data collected from the base station such as signal strength and direction of communications between the computing device and the base station. The mobility manager 134 may also determine the relative location based on the location of the base station and GPS data received from the computing device. The relative location data may include a distance between the computing device and the base station, the cardinal direction from the base station to the subscriber device, and/or any other similar measurements.

In instances where the road characteristic identifier 124 analyzes the location of the computing device 108 to determine the road characteristic 130, the road characteristic identifier 124 may access the device locations 136 for the location of the computing device 108. The sensor data 118 and/or the vehicle data 120 may also include data that indicates the location of the computing device 108. Therefore, the device data 132 may include data that indicates the location of the computing device 108. The road characteristic identifier 124 may use the device locations 136 and/or the location data in the device data 132 when determining the road characteristic 130.

The server may include an action instruction generator 150. The action instruction generator 150 is configured to generate an instruction for an entity or computing device based on the road characteristic 130. The instruction may be an instruction to correct the road characteristic 130 in the event that the road characteristic 130 is a defect in the road, an object in the road, and/or any other similar road characteristic. The instruction may be an instruction related to avoiding the road characteristic 130 in the event that the road characteristic 130 may be one that may cause damage to a vehicle, delay traveling, cause a traffic jam, and/or any other similar result.

The action instruction generator 150 may access the actions 152 that include the various actions. The actions in the actions 152 may correspond to various road characteristics. Based on the action, the action instruction generator 150 may generate an instruction to perform the action. For example, the road characteristic of a pothole may correspond to a repair instruction and an avoidance instruction. The road characteristic of a broken curb may correspond to a repair instruction. The road characteristic of a stalled vehicle may correspond to an avoidance instruction and an instruction to dispatch a tow truck. Other road characteristics may correspond to different actions.

In stage C, the action instruction generator 150 receives the road characteristic 130 that indicates there is a pothole in the right lane of Elm Street at Pecan Street. The action instruction generator 150 accesses the actions 152 to determine the actions that correspond to a pothole. The actions that correspond to a pothole may include a repair action and an avoidance action. Based on those actions, the action instruction generator 150 may generate a repair instruction 156 to repair the pothole in the right lane of Elm Street at Pecan Street and an avoidance instruction 154 to avoid the pothole in the right lane of Elm Street at Pecan Street. In some implementations, the action instruction generator 150 may generate action instructions that indicate the time that the sensor data 118 and/or vehicle data 120 indicated that the vehicle likely traveled over, by, and/or near the road characteristic 130. This timing data may also be included in the road characteristic 130.

The server 106 may include a recipient identifier 140. The recipient identifier 140 may be configured to identify the recipient of the instructions generated by the action instruction generator 150. The recipient identifier 140 may access the recipients 142 that includes data identifying various recipients of the different instructions generated by the action instruction generator 150. Each recipient may include data identifying one or more computing devices to receive the instructions.

The recipient identifier 140 may receive the instructions from the action instruction generator 150 and classify the action in the instruction. Based on the classification of the action in the instruction, the recipient identifier 140 may identify one or more recipients from the recipients 142. Some example classifications of the actions may include an avoidance action, a repair action, a monitor action, a dispatch action, and/or any other similar action. The recipients 142 may identify one or more recipients for each different classification of the action. Some of the recipients may correspond to the same actions.

In some implementations, the instructions from the action instruction generator 150 may include a classification of the corresponding action. In this case, the recipient identifier 140 may receive an instruction and a classification of the action in the instruction. The recipient identifier 140 may access the recipients 142 and identify the recipients that correspond to the classification of the action.

In stage D, the recipient identifier 140 may receive the repair instruction 156 and/or the avoidance instruction 154 from the action instruction generator 150. In response to receiving the avoidance instruction 154, the recipient identifier 140 may classify the avoidance instruction 154 as including an avoidance action. In response to receiving the repair instruction 156, the recipient identifier 140 may classify the repair instruction as including a repair action. The recipient identifier 140 may access the recipients 142 and determine that the Department of Transportation is the recipient for repair instructions as indicated by recipient 146. The recipients 142 may identify the computing device 160 as the computing device that should receive the instructions for the Department of Transportation.

The recipient identifier 140 may access the recipients 142 and determine that the recipient of an avoidance action are devices that generate navigation instructions. The recipients 142 may include data identifying the computing devices that are configured to generate navigation actions. In some instances, the recipient identifier 140 may indicate to transmit the avoidance instruction to each of the computing devices that are configured to generate navigation actions. This may be the case if the number of computing devices is below a threshold number. In some instances, the recipient identifier 140 may communicate with the mobility manager 134 to determine which of the computing devices are within a threshold distance of the location specified in the avoidance instruction 154. The recipient identifier 140 may determine to transmit the avoidance instruction 154 to those computing devices that are configured to generate navigation actions and that are within a threshold distance of the location specified in the avoidance instruction 154. The recipient identifier 140 may determine that the computing device of vehicle 164 is located within a threshold distance of the location of the pothole 122 and should receive the avoidance instructions 154, as indicated by recipient 144.

With the recipients for the instructions identified and in stage E, the communications interface 148 transmits the avoidance instructions 154 and the repair instructions 156 to the corresponding computing devices. The communications interface 148 transmits the avoidance instructions 154 to the computing device 166 of the vehicle 164. The computing device 166 receives the avoidance instructions 154. The computing device 166 may generate navigation instructions that avoid the location of the pothole 122. The computing device 166 may continue to generate navigation instructions that avoid the location of the pothole 122 until the computing device 166 receives data indicating that the pothole 122 has been repaired or for a predetermined period of time.

The communications interface 148 transmits the repair instructions 156 to the computing device 160 of the Department of Transportation or other entity that handles road repairs. The user 158 may view the location of the pothole 122 on the computing device 160 and may assign a crew to repair the pothole 122. In some implementations, the user 158 may provide information related to the time period for repairing the pothole 122. The server 106 may receive this information and provide to the computing device 166 data indicating an expected repair time. The computing device 166 may generate navigation instructions that avoid the location of the pothole 122 until the expected repair time has elapsed.

In some implementations, the road characteristic identifier 124 may receive data from other devices to determine characteristics of the road. The road characteristic identifier 124 may request, from the mobility manager 134, data identifying computing devices that are within a threshold distance of the computing device 108 when the computing device 108 generated and/or received data indicating the presence of the pothole 122. The road characteristic identifier 124 may receive, from the mobility manager 134 data identifying the computing device 170. The computing device 170 may have been in the vehicle 104 while the user 102 was driving the vehicle 104 down the road that had the pothole 122. In some instances, the road characteristic identifier 124 may determine that the computing device 170 traveled along a similar path as the computing device 108. Based on this determinization, the road characteristic identifier 124 may determine that the computing device 170 was in the vehicle 104 when the computing device 108 generated and/or received data indicating the presence of the pothole 122.

The computing device 170 may include a communications interface 174 that is configured to communicate with the server 106, the computing device 108, and/or any other similar devices using a wired or wireless connection. The computing device 170 may include various sensors 176 that may include an accelerometer, a gyroscope, a GPS receiver, a barometer, an ambient light sensor, a camera, a compass, a gravity sensor, a proximity sensor, a magnetometer, a microphone and/or any other similar sensors. The sensor data 178 may store data generated by the sensors 176. The computing device 170 may also include a vehicle application 172 that communicates with the road characteristic identifier 124.

The road characteristic identifier 124 may request data from the computing device 170 using various techniques. A first technique may involve the road characteristic identifier 124 determining that the computing device 170 was likely in the vehicle 104 when the computing device 108 generated and/or received data indicating the presence of the pothole 122. In this case, the road characteristic identifier 124 may request, from the vehicle application 172, the sensor data 178 that the sensors 176 generated at approximately the same time that the computing device 108 generated and/or received data indicating the presence of the pothole 122. The road characteristic identifier 124 may receive the sensor data 178 from the computing device 170 and use the sensor data 178 as additional data to determine the characteristics of the road. For example, the accelerometer of the sensors 176 may indicate that the vehicle 104 experienced a jolt that may indicate the presence of the pothole 122. The accelerometer of the sensors 176 may have detected the jolt at approximately the same time as the accelerometer of the sensors 110.

A second technique that the road characteristic identifier 124 may request data from the computing device 170 may involve determining that the computing device 170 is in the vicinity of the pothole 122. Based on determining that the computing device 170 is in the vicinity of the pothole 122, the road characteristic identifier 124 may request additional details related to the road condition near the pothole 122. The road characteristic identifier 124 may transmit an information request 180 that requests any additional information related to the road at the location of the pothole 122. The user 102 may respond to the information request 180 with the road details 182. The user 102 may include any road, vehicle, traffic, and/or any other similar information in the road details 182. For example, the user 102 may indicate that there is curb damage and provide the location of the curb damage. The user 102 may indicate a size of the pothole 122 and whether other potholes are located in the road, such as those that may not be in the travel lanes. The road characteristic identifier 124 may use the road details 182 to update and/or confirm the road conditions 130.

Figure 2:
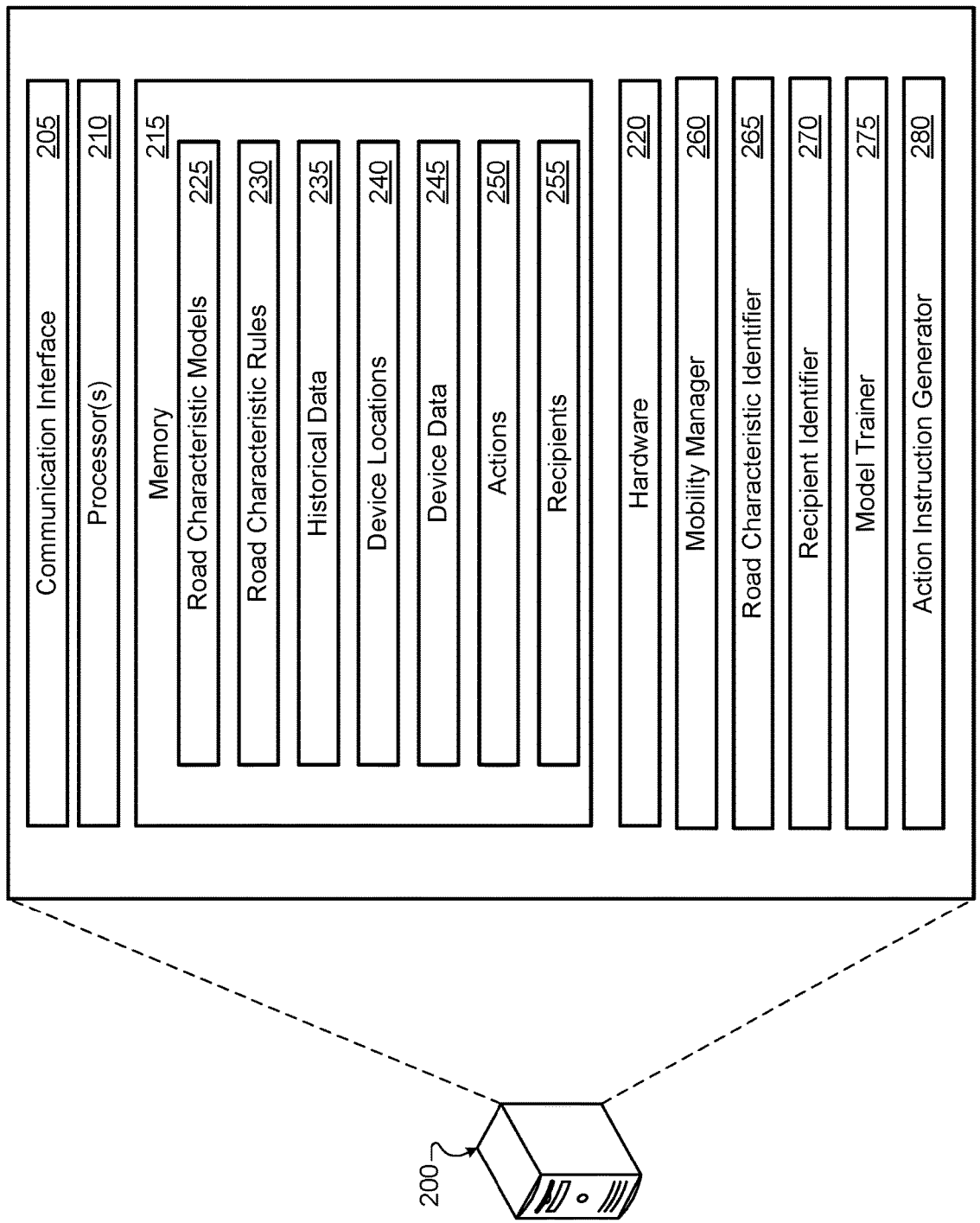
FIG. 2 illustrates an example server that is configured to detect the condition of a road and generate an instruction based on that condition.

FIG. 2 illustrates an example server 200 that is configured to detect the condition of a road and generate an instruction based on that condition. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 260. The mobility manager 260 may be similar to the mobility manager 134 of FIG. 1. The mobility manager 260 may be configured to monitor the location of a computing device that is connected to the server 200 through a wireless base station. The location of the computing device may include the location of the wireless base station to which the computing device is connected and/or GPS data received from the computing device. The mobility manager 260 may store the location data in the device locations 240 of the server 200.

In some implementations, the mobility manager 260 may determine the location of a computing device at periodic intervals, such as every five seconds. In some implementations, the mobility manager 260 may determine the location of a computing device when the computing device connects to a different wireless base station and/or provides updated GPS data. In some implementations, the mobility manager 260 may determine the location of the computing device relative to the base station with which the computing device is communicating. In this case, the mobility manager 260 may determine the relative location based on data collected from the base station such as signal strength and direction of communications between the computing device and the base station. The mobility manager 260 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implement a road characteristic identifier 265. The road characteristic identifier 265 may be similar to the road characteristic identifier 124 of FIG. 1. The road characteristic identifier 265 may be configured to analyze the device data 245 that includes sensor data and vehicle data received from devices such as the computing device 108 and determine a characteristic of the road. A characteristic of the road may include physical characteristics of the road, such as potholes, bumps, broken pavement, cracking, slippage cracks, depressions, ruts, ripples, upheaval, loose pavement, and any other similar characteristics. A characteristic may also include obstacles in the roads. These obstacles may include objects that remain stationary even after contacting a vehicle and objects that move after contacting a vehicle.

The road characteristic identifier 265 may be configured to analyze the device data 245 received from computing devices that are located in and in the vicinity of vehicles and data included in the device locations 240. The computing devices may provide sensor data collected from sensors that are included in the computing devices and vehicle data that includes vehicle diagnostic data received from the vehicle. The server 200 receives the sensor data and the vehicle data through the communications interface 205 and stores the sensor data and the vehicle data in the device data 245. In some implementations, the data received from the computing devices may include an identifier of the vehicle and/or timestamp data.

Based on analyzing the device data 245, the road characteristic identifier 265 may determine a characteristic and/or condition of the road. A characteristic and/or condition of the road may include physical characteristics of the road, such as potholes, bumps, broken pavement, cracking, slippage cracks, depressions, ruts, ripples, upheaval, loose pavement, and any other similar characteristics. A characteristic may also include obstacles in the roads. These obstacles may include objects that remain stationary even after contacting a vehicle and objects that move after contacting a vehicle. The characteristics may include those in the travel lanes of the road and those on the shoulder, median, and/or other similar portions of the road.

The device data 245 may include data received from devices that are connected to an on-board diagnostic port of a vehicle, integrated with vehicle, located inside the vehicle, and/or located outside of the vehicle. The devices located inside or outside of the vehicle may be mobile devices that include various sensors. The mobile devices may provide data directly to the server 200 and/or to the device connected to the on-board diagnostic port or integrated with the vehicle. In some implementations, the device data 245 may be data provided by a user in response to a prompt from the road characteristic identifier 265.

The road characteristic identifier 265 may analyze the device data 245 using the road characteristic models 224 and/or the road characteristic rules 230 to determine the characteristics of the road. The road characteristic rules 230 may specify how to compare the device data 245 to determine the characteristics of the road. For example, a road characteristic rule may specify that if the data from the accelerometer indicates that acceleration in a direction perpendicular to the road is greater than a threshold and if, at approximately the same time, the tire pressure increases by at least twenty percent and then returns to the previous tire pressure, then the road characteristic rule may indicate that a pothole is at the location where device data 245 was collected or generated. The road characteristic models 225 may be configured to receive the device data 245 and output data indicating the characteristic of the road. The model trainer 275 may train the road characteristic models 225 using machine learning and historical data 235 that includes sensor data and vehicle data collected from vehicles before, during, and after the vehicles encountered the road characteristic. In some implementations, the road characteristic models 225 may output a confidence score that indicates a likelihood that the vehicle encountered the road characteristic.

The road characteristic identifier 265 may be configured to communicate with the mobility manager 260 to determine the devices that are located inside the vehicle and/or located outside of the vehicle when the vehicle encountered the road characteristic or condition. These devices may be ones that are not communicating directly with the computing device connected to the on-board diagnostic port and/or integrated with the vehicle. The road characteristic identifier 265 may provide the mobility manager 260 with data identifying the location of the device communicating with the vehicle and/or the location of the device communicating with the vehicle when the vehicle encountered the road characteristic or condition and data identify a time when the vehicle encountered the road characteristic or condition. The road characteristic identifier 265 may provide a threshold distance within which the mobility manager 260 should identify the nearby computing devices. The mobility manager 260 may identify the devices that were within the threshold distance of the location of the road characteristic during the specified time period. The road characteristic identifier 265 may use a lower threshold distance, such as three meters, to identify computing devices that were likely in the vehicle. The road characteristic identifier 265 may use a location range, such as three to twenty meters, to identify those computing devices that were outside the vehicle. The road characteristic identifier 265 may request data identifying the computing devices that were in the vicinity of the road characteristic when the vehicle passed the road characteristic and/or computing devices that are currently located near the road characteristic.

For computing devices that were likely inside the vehicle when the vehicle interacted with the road characteristic, the road characteristic identifier 265 may request data from the identified computing devices by communicating with a vehicle application that is running on the computing device. The road characteristic identifier 265 may request, from the vehicle application, sensor data generated, by the computing device, when the computing device was in the vicinity of the location of the road characteristic. The road characteristic identifier 265 may receive the sensor data from the computing device and use the sensor data as additional data to determine the characteristics of the road. For example, accelerometer data may indicate that the computing device experienced a jolt that may indicate the presence of the pothole 122. The accelerometer may have detected the jolt at approximately the same time as the accelerometer of the computing device communicating with the on-board diagnostic port. The road characteristic identifier 265 may use the information from the vehicle application to update and/or confirm the identified road characteristic.

For computing devices that were likely inside the vehicle when the vehicle interacted with the road characteristic, that were likely nearby the vehicle when the vehicle interacted with the road characteristic, and that are currently nearby the road characteristic, the road characteristic identifier 265 may request additional details related to the road characteristic. The road characteristic identifier 265 may transmit an information request that requests any additional information related to the road characteristic. A user of the computing device may respond to the information request with the details related to the road characteristic. The user may include any road, vehicle, traffic, and/or any other similar information in the details related to the road characteristic or in the vicinity of the road characteristic. For example, the user may indicate that there is curb damage near the road characteristic. The user may indicate a size of the road characteristic and a condition of the road outside of the travel lanes. The road characteristic identifier 265 may use the information from the user to update and/or confirm the identified road characteristic.

In some implementations, the road characteristic identifier 265 may crowdsource device data received from computing devices in different vehicles and collected at approximately the same location on the same day, the same week, or any other similar time period. The road characteristic identifier 265 may crowdsource data by analyzing the data received from multiple vehicles using the road characteristic models 225 and/or the road characteristic rules 230 and comparing the results. If device data collected from a majority of the vehicles, or another threshold percentage of the vehicles, that drove on the same road during a time period indicates that the road has a certain characteristic, then the road characteristic identifier 265 may determine that the road likely has that characteristic.

The one or more processors 210 may implement a model trainer 275. The model trainer 275 may be configured to generate the road characteristic models 225 using the historical data 235 and machine learning. The historical data 235 may include vehicle data, sensor data, and location data collected from various computing devices that are located in vehicles. The historical data 235 may also include data identifying the characteristic or condition of the road traveled by the vehicle. The model trainer 275 may generate multiple data samples that each include vehicle data, sensor data, location data, and data identifying the road characteristic. Each data sample may include data collected from a vehicle while the vehicle interacted with the road characteristic. For example, the historical data 235 may include vehicle data, sensor data, and location data collected from vehicles while the vehicle drove on smooth pavement in the right lane of Oak Street between Maple Street and Walnut Street. The model trainer 275 may generate multiple data samples that each include vehicle data, sensor data, and location data collected over the period when each vehicle drove through that block. The locations of some data samples may overlap. Each of the data samples may include a smooth pavement label indicating that the vehicle drove over pavement that was not in need of repair or should be avoided. As another example, the historical data 235 may include vehicle data, sensor data, and location data collected from vehicles while the vehicles drove in the center lane of a freeway between mile markers 45 and 46. In that stretch of road, the pavement may exhibit a depression. The model trainer 275 may generate multiple data samples that each include vehicle data, sensor data, and location data collected from the various vehicles that drove over that stretch of the freeway.

The model trainer 275 may train the road characteristic models 225 using the data samples and machine learning. The model trainer 275 may train multiple models that are each configured to receive different types of data, depending on the vehicle data, sensor data, and location data included in the data samples. For example, some models may be configured to receive tire pressure data and others may not be configured to receive tire pressure data. The road characteristic identifier 265 may select the appropriate model from the road characteristic models 225 based on the data included in the device data 245. In some implementations, the model trainer 275 may be implemented by one or more processors on another computing device. That computing device may provide the models to the server 200.

In some implementations, the model trainer 275 may be configured to analyze the historical data 235 and generate the road characteristic rules 230. The model trainer 275 may identify patterns in the historical data 235 collected at locations of various road characteristics. For example, the model trainer 275 may analyze the historical data 235 collected at the location of a pothole. The model trainer 275 may identify a pattern of spiking acceleration data from the accelerometer and spiking tire pressure of tires on one side of the vehicle. The model trainer 275 may generate a rule indicating that two spikes in acceleration data in a direction perpendicular to the road above a threshold of twenty miles per hour per second that corresponds to two spikes in tire pressure data from the tires on one side of the vehicle indicates that the road has a pothole. The model trainer 275 may store this rule in the road characteristic rules 128. The model trainer 275 may generate and store other rules based on other patterns in the historical data 235.

The one or more processors 210 may implement an action instruction generator 280. The action instruction generator 280 may be similar to the action instruction generator 150 of FIG. 1. The action instruction generator 280 may be configured to generate an instruction for an entity or computing device based on the road characteristic identified by the road characteristic identifier 265. The instruction may be an instruction to correct the road characteristic in the event that the road characteristic is a defect in the road, an object in the road, and/or any other similar road characteristic. The instruction may be an instruction related to avoiding the road characteristic in the event that the road characteristic may be one that may cause damage to a vehicle, delay traveling, cause a traffic jam, and/or any other similar result.

The action instruction generator 280 may access the actions 250 that include the various actions. The actions in the actions 250 may correspond to various road characteristics. Based on the action, the action instruction generator 280 may generate an instruction to perform the action. For example, the road characteristic of a pothole may correspond to a repair instruction and an avoidance instruction. The road characteristic of a broken curb may correspond to a repair instruction. The road characteristic of a stalled vehicle may correspond to an avoidance instruction and an instruction to dispatch a tow truck. Other road characteristics may correspond to different actions.

In some implementations, the model trainer 275 may be configured to generate the actions 250 based on the historical data 235. The historical data 235 may include actions performed by various entities in response to different road characteristics. The model trainer 275 may determine that entities repair potholes and other defects in the pavement. Based on this determination, the model trainer 275 may store, in the actions 250, data indicating to perform a repair action in response to determining that a pothole or other defect exists in the pavement. The historical data 235 may include data indicating that some vehicles swerved when the vehicle approached a pothole. Based on this data, the model trainer 275 may store, in the actions 250, data indicating to generate an avoidance instruction in response to determining that a pothole is in the road.

The one or more processors 210 may implement a recipient identifier 270. The recipient identifier 270 may be similar to the recipient identifier 140 of FIG. 1. The recipient identifier 270 may be configured to identify the recipient of the instructions generated by the action instruction generator 280. The recipient identifier 270 may access the recipients 255 that includes data identifying various recipients of the different instructions generated by the action instruction generator 280. Each recipient may include data identifying one or more computing devices to receive the instructions.

The recipient identifier 270 may receive the instructions from the action instruction generator 280 and classify the action in the instruction. Based on the classification of the action in the instruction, the recipient identifier 270 may identify one or more recipients from the recipients 255. Some example classifications of the actions may include an avoidance action, a repair action, a monitor action, a dispatch action, and/or any other similar action. The recipients 255 may identify one or more recipients for each different classification of the actions. Some of the recipients may correspond to the same actions.

In some implementations, the instructions from the action instruction generator 280 may include a classification of the corresponding action. In this case, the recipient identifier 270 may receive an instruction and a classification of the action in the instruction. The recipient identifier 270 may access the recipients 255 and identify the recipients that correspond to the classification of the action.

In some implementations, the model trainer 275 may be configured to generate the recipients 255 based on the historical data 235. The historical data 235 may include data identifying the entities that performed actions to remediate the road characteristic, the entities or devices that generate instructions for vehicles or users that may be affected by the road characteristic, and/or any other actions performed by entries related to the road characteristics. The model trailer 275 may determine the entities that acted on the different road characteristics based on the historical data 235. The model trainer 275 may include, in the recipients 255, data identifying the entities and/or computing devices that should receive instructions for each action classification.

With the instructions generated and the recipients identified, the communication interface 205 transmits the instructions to the computing devices of the identified recipients. In some instances, the action instruction generator 280 may include additional instructions. In the case of a repair instruction, the instructions may request that the entity that received the instructions provide additional data related to when the road characteristic is repaired. In the case of an avoidance instruction, the instructions may indicate to avoid the particular area for a period of time. In some implementations and after transmitting the instructions, the road characteristic identifier 265 may analyze the device data 132 collected in the area of the road characteristic to determine whether the road characteristic has been repaired. In this case avoidance instructions may indicate to avoid the particular area until the road characteristic is repaired. The road characteristic identifier 265 may later determine that the road characteristic has been repaired and the communication interface 205 may transmit data indicating to no longer follow the avoidance instructions.

Figure 3:
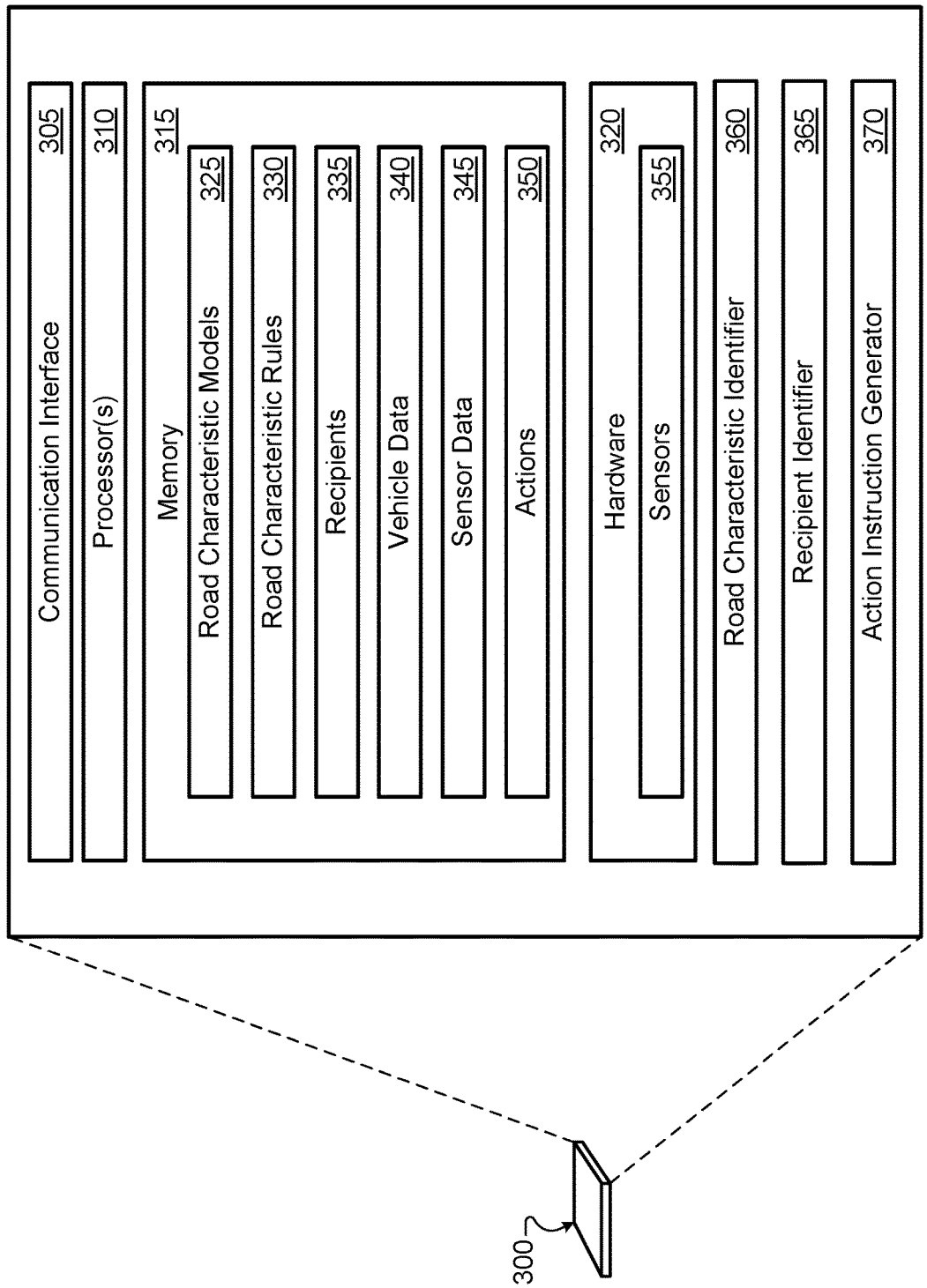
FIG. 3 illustrates an example computing device that is configured to communicate with a vehicle, detect the condition of a road, and generate an instruction based on that condition.

FIG. 3 illustrates an example computing device 300 that is configured to communicate with a vehicle, detect the condition of a road, and generate an instruction based on that condition. The computing device 300 may be any type of computing device that is configured to communicate with other computing devices. The computing device 300 may interact with a wireless carrier network. The computing device 300 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The computing device 300 may be similar to computing device 108 and/or computing device 166 of FIG. 1. Some of the components of the computing device 300 may be implemented in a single computing device or distributed over multiple computing devices. Some of the components may be in the form of virtual machines or software containers that are hosted in a cloud in communication with disaggregated storage devices. In some implementations, the computing device 300 may be integrated into a vehicle or communicate with a vehicle through an on-board diagnostic port.

The computing device 300 may include a communication interface 305, one or more processors 310, memory 315, and hardware 320. The communication interface 305 may include communication components that enable the computing device 300 to transmit data and receive data from devices connected to the wireless carrier network. The communication interface 305 may include an interface that is configured to communicate with base stations of a wireless carrier network. The communication interface 305 may transmit data to the base stations for transmission to the other devices. In some implementations, the communication interface 305 may be configured to communicate using over a wide area network, a local area network, the internet, a wired connection, a wireless connection, and/or any other type of network or connection. The wireless connections may include Wi-Fi, short-range radio, infrared, and/or any other wireless connection. In some implementations, the communication interface 305 may include a connector that is configured to couple to an on-board diagnostic port of a vehicle.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. The hardware 320 may also include various sensors 355 that are configured to detect the movement of the computing device 300, the location of the computing device 300, and/or the environment around the computing device 300. For example, the sensors 355 may include an accelerometer, a gyroscope, a GPS receiver, a barometer, an ambient light sensor, a camera, a compass, a gravity sensor, a proximity sensor, a magnetometer, a microphone and/or any other similar sensors.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The memory may store sensor data 345 that is generated by the various sensors 355 and vehicle data 340 that includes data received from the vehicle through the communication interface 305. The vehicle data 340 may include diagnostic data such as real-time vehicle information (engine revolutions per minute, vehicle speed, spark advance, airflow rate, coolant temperature, tire pressure, airbag status, etc.), status of the check engine light, emission readiness status, diagnostic codes, oxygen sensor results, miles driven, vehicle identification number, and/or any other similar vehicle data. The sensor data 345 and the vehicle data 340 may be collected and/or stored while the vehicle is on, moving, and/or in response to a request to collect and store data. The sensor data 345 and the vehicle data 340 may store data for a previous time period, such as the previous thirty minutes. As the sensors 355 generate additional sensor data and/or the communication interface 305 receive additional vehicle data, the sensor data 345 and the vehicle data 340 may overwrite the oldest data. The sensor data 345 and the vehicle data 340 may include timestamps. In some implementations, the memory 315 may store a vehicle identifier that identifies a vehicle to which the computing device 300 is communicating. In some implementations, the memory 315 may store data identifying an owner of the vehicle and/or identifiers for a mobile device of the owner of the vehicle.

The one or more processors 310 may implement a road characteristic identifier 360. The road characteristic identifier 360 may be similar to the road characteristic identifier 360 of FIG. 1 and/or the road characteristic identifier 360 of FIG. 2. The road characteristic identifier 360 may be configured to analyze the sensor data 345 and the vehicle data 340 and determine a characteristic of the road. A characteristic of the road may include physical characteristics of the road, such as potholes, bumps, broken pavement, cracking, slippage cracks, depressions, ruts, ripples, upheaval, loose pavement, and any other similar characteristics. A characteristic may also include obstacles in the roads. These obstacles may include objects that remain stationary even after contacting a vehicle and objects that move after contacting a vehicle.

Based on analyzing the sensor data 345 and the vehicle data 340, the road characteristic identifier 360 may determine a characteristic and/or condition of the road. A characteristic and/or condition of the road may include physical characteristics of the road, such as potholes, bumps, broken pavement, cracking, slippage cracks, depressions, ruts, ripples, upheaval, loose pavement, and any other similar characteristics. A characteristic may also include obstacles in the roads. These obstacles may include objects that remain stationary even after contacting a vehicle and objects that move after contacting a vehicle. The characteristics may include those in the travel lanes of the road and those on the shoulder, median, and/or other similar portions of the road.

The road characteristic identifier 360 may analyze the sensor data 345 and the vehicle data 340 using the road characteristic models 325 and/or the road characteristic rules 330 to determine the characteristics of the road. The road characteristic rules 330 may specify how to compare the sensor data 345 and the vehicle data 340 to determine the characteristics of the road. For example, a road characteristic rule may specify that if the data from the accelerometer indicates that acceleration in a direction perpendicular to the road is greater than a threshold and if, at approximately the same time, the tire pressure increases by at least twenty percent and then returns to the previous tire pressure, then the road characteristic rule may indicate that a pothole is at the location where sensor data 345 and/or the vehicle data 340 was collected or generated. The road characteristic models 325 may be configured to receive the sensor data 345 and the vehicle data 340 and output data indicating the characteristic of the road. A server may train the road characteristic models 325 using machine learning and historical data that includes sensor data and vehicle data collected from vehicles before, during, and after the vehicles encountered the road characteristic. In some implementations, the road characteristic models 547 may output a confidence score that indicates a likelihood that the vehicle encountered the road characteristic.

In some implementations, the communication interface 305 may communicate with nearby computing devices. The computing devices may include a mobile phone of a passenger in the vehicle, a computing device connected to the on-board diagnostic port of a vehicle near the computing device 300, a computing device of a pedestrian, and/or any other nearby computing device. In the case of a mobile phone, the communication interface 305 may receive data generated by the sensors of the mobile phone. The communication interface 305 may store the data generated by the sensors of the mobile phone in the sensor data 345 with data identifying the mobile phone, the time that the mobile phone generated the data, and a location of the mobile phone when the mobile phone generated the data. In the case of computing device connected to the on-board diagnostic port of a vehicle near the computing device 300, the communication interface 305 may receive data generated by the sensors of the other computing device and data received from the vehicle through the on-board diagnostic port. The communication interface 305 may store the data generated by the sensors in the sensor data 345 and the data received from the vehicle through the on-board diagnostic port in the vehicle data 340. The communication interface 305 may store this data with data identifying the other computing device, the time that the other computing device generated or received the data, and a location of the other computing device when the other computing device received or generated the data.

The road characteristic identifier 360 may analyze this additional sensor data and vehicle data received from other computing devices in a similar manner as the sensor data generated by the sensors 355 and the vehicle data received from the on-board diagnostic port. The road characteristic identifier 360 may determine that the additional sensor data and vehicle data indicates that the road has a characteristic and that the sensor data generated by the sensors 355 and the vehicle data received from the on-board diagnostic port indicates that the road has the same characteristic. In this way, the road characteristic identifier 360 may be crowd-sourcing the data from nearby computing devices to determine the road characteristic.

The one or more processors 310 may implement an action instruction generator 370. The action instruction generator 370 may be similar to the action instruction generator 150 of FIG. 1 and/or the action instruction generator 280 of FIG. 2. The action instruction generator 370 may be configured to generate an instruction for an entity or computing device based on the road characteristic identified by the road characteristic identifier 360. The instruction may be an instruction to correct the road characteristic in the event that the road characteristic is a defect in the road, an object in the road, and/or any other similar road characteristic. The instruction may be an instruction related to avoiding the road characteristic in the event that the road characteristic may be one that may cause damage to a vehicle, delay traveling, cause a traffic jam, and/or any other similar result.

The action instruction generator 370 may access the actions 350 that include the various actions. The actions in the actions 350 may correspond to various road characteristics. The computing device 300 may receive the actions 350 from another computing device, such as the server 106 and/or the server 200. Based on the action, the action instruction generator 370 may generate an instruction to perform the action. For example, the road characteristic of a pothole may correspond to a repair instruction and an avoidance instruction. The road characteristic of a broken curb may correspond to a repair instruction. The road characteristic of a stalled vehicle may correspond to an avoidance instruction and an instruction to dispatch a tow truck. Other road characteristics may correspond to different actions.

The one or more processors 310 may implement a recipient identifier 365. The recipient identifier 365 may be similar to the recipient identifier 140 of FIG. 1 and/or the recipient identifier 270 of FIG. 2. The recipient identifier 365 may be configured to identify the recipient of the instructions generated by the action instruction generator 370. The recipient identifier 365 may access the recipients 335 that includes data identifying various recipients of the different instructions generated by the action instruction generator 370. Each recipient may include data identifying one or more computing devices to receive the instructions.

The recipient identifier 365 may receive the instructions from the action instruction generator 370 and classify the action in the instruction. Based on the classification of the action in the instruction, the recipient identifier 365 may identify one or more recipients from the recipients 335. Some example classifications of the actions may include an avoidance action, a repair action, a monitor action, a dispatch action, and/or any other similar action. The recipients 335 may identify one or more recipients for each different classification of the actions. Some of the recipients may correspond to the same actions. The computing device 300 may receive the recipients 335 from another computing device, such as the server 106 and/or the server 200.

In some implementations, the instructions from the action instruction generator 370 may include a classification of the corresponding action. In this case, the recipient identifier 365 may receive an instruction and a classification of the action in the instruction. The recipient identifier 365 may access the recipients 335 and identify the recipients that correspond to the classification of the action.

With the instructions generated and the recipients identified, the communication interface 305 transmits the instructions to the computing devices of the identified recipients. The communication interface 305 may transmit the instructions to a nearby device located in another vehicle, to a computing device of an entity that is responsible for repairing the roads, to a nearby computing device that communicates with other computing devices, and/or to any other similar computing device identified by the recipient identifier 365. In the case of transmitting the instructions to a nearby computing device that communicates with other computing devices, there may be computing devices located along the road that are configured to communicate with the vehicles moving along the road. The computing devices may provide the vehicles with data regarding the road conditions ahead. The communication interface 305 may transmit data related to the road characteristic to the computing devices located along the road. Those computing devices may transmit that information to computing devices in other vehicles as those vehicles move along the road.

Figure 4:
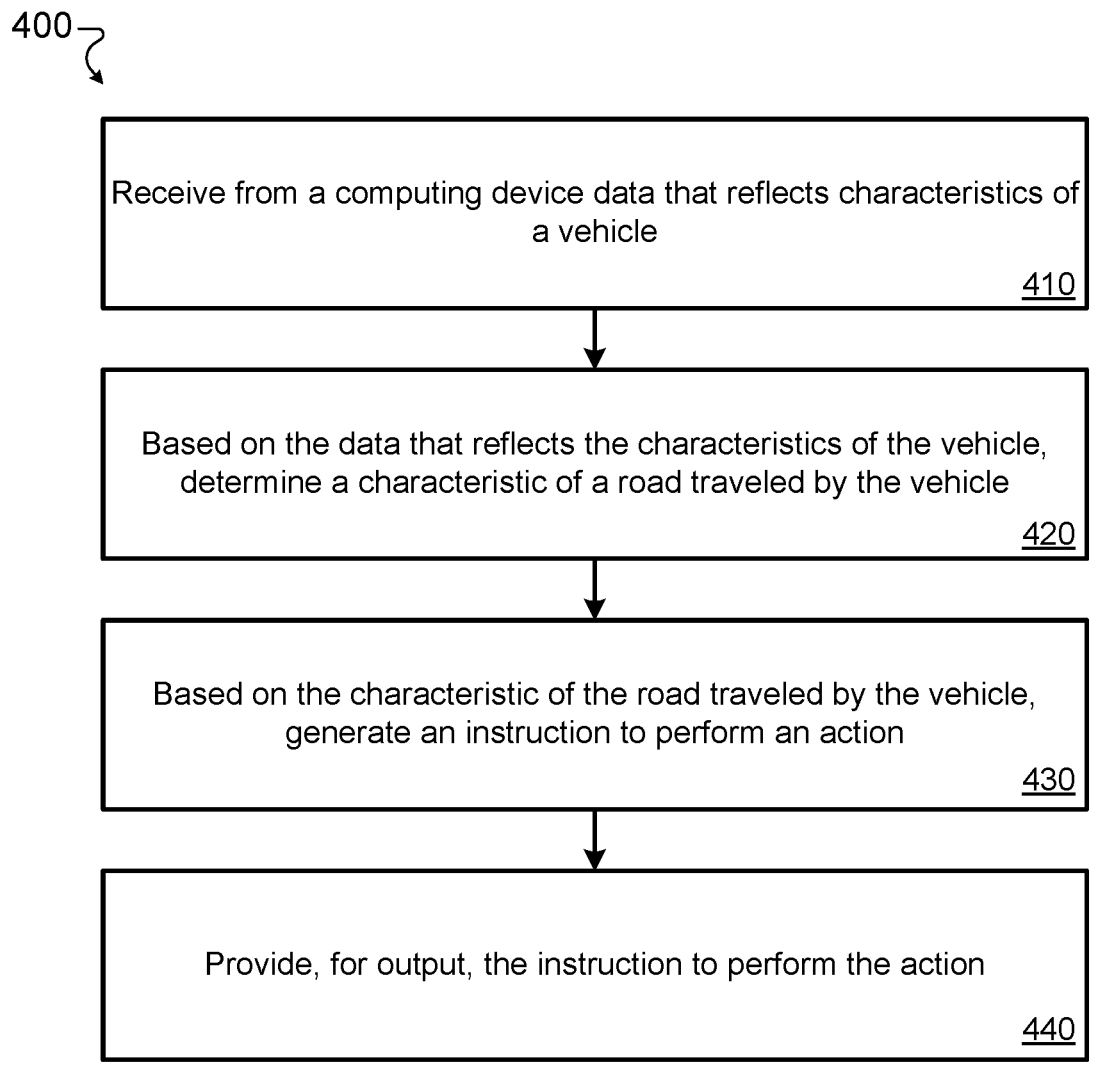
FIGS. 4 and 5 are flowcharts of example processes for detecting the condition of a road and generating an instruction based on that condition.

FIG. 4 is a flowchart of example process 400 for detecting the condition of a road and generating an instruction based on that condition. In general, the process 400 receives data from a computing device located in a vehicle. Based on that data, the process determines a characteristic of the road that the vehicle traveled. The process 400 outputs an instruction based on that characteristic of the road. The process 400 will be described as being performed by the server 106 of FIG. 1 and will include references to other components in FIG. 1. The process 400 may also be performed by the server 200 of FIG. 2 and/or the computing device 300 of FIG. 3.

The server 106 receives, from a computing device 108, data that reflects characteristics of a vehicle 104 (410). The computing device 108 may be connected to an on-board diagnostic port of the vehicle. The data that reflects characteristics of a vehicle 104 may include speed data, location data, braking data, engine temperature data, tire pressure data, engine speed data, accelerometer data, gyroscope data, magnetometer data, and gravity sensor data. Some of this data may be received from the vehicle through the on-board diagnostic port, and some may be generated by sensors 110 that are included in the computing device 108.

Based on the data that reflects the characteristics of the vehicle, the server 106 determines a characteristic of a road traveled by the vehicle 104 (420). The server 106 may use road characteristic models and/or road characteristic rules to analyze the data that reflects the characteristics of the vehicle. The road characteristic rules may specify how to compare the data that reflects the characteristics of the vehicle to determine the characteristics of the road. The road characteristic models may be configured to receive the data that reflects the characteristics of the vehicle and output data indicating the characteristics of the road.

In some implementations, the server 106 may receive mobile device data from a mobile device of a passenger of the vehicle 104. The mobile device data may include data generated by sensors that are included in the mobile device. These sensors may include an accelerometer, camera, microphone, gravity sensor, proximity sensor, gyroscope, magnetometer, GPS receiver, and/or any other similar sensors. In some implementations, the mobile device may communicate with the computing device 108 and provide the computing device 108 with the mobile device data. The computing device 108 may provide the mobile device data to the server 106. In some implementations, the mobile device may communicate with the server 106, and the mobile device may provide the mobile device data to the server 106. The server 106 may use analyze the mobile device data using the road characteristic models and/or road characteristic rules to determine the characteristic of a road traveled by the vehicle 104.

In some implementations, the server 106 may receive weather data and analyze the weather data to determine the characteristic of a road traveled by the vehicle 104. The server 106 may analyze the weather data, the data that reflects the characteristics of the vehicle, and/or the mobile device data using the road characteristic models and/or road characteristic rules. The server 106 may select a road characteristic model and/or a road characteristic rule based on the data included in the weather data, the data that reflects the characteristics of the vehicle, and/or the mobile device data. For example, if the weather data, the data that reflects the characteristics of the vehicle, and/or the mobile device data includes tire pressure data, then the server 106 may select a road characteristic model that is configured to receive tire pressure data and/or a road characteristic rule that specifies how to analyze tire pressure data.

As an example, the server 106 may analyze the weather data, the data that reflects the characteristics of the vehicle, and/or the mobile device data and determine the road characteristic is an obstacle in the road. An obstacle may include an object that can be moved from the road such as a stalled vehicle, down tree, down power lines, and/or any other similar object. As another example, the server 106 may analyze the weather data, the data that reflects the characteristics of the vehicle, and/or the mobile device data and determine the road characteristic is a defect in the road. A defect in the road may include a pothole, pavement cracking, loose pavement, a damaged curb, ripples in the pavement, and/or any other similar road defect.

Based on the characteristic of the road traveled by the vehicle 104, the server 106 generates an instruction to perform an action (430). The server 106 may access actions 152 that specify the actions to perform to correct the road characteristic. In some instances, the road characteristic may not correspond to any actions. This may be the case if the road characteristic indicates smooth pavement. A road characteristic such as a defect in the road may correspond to a repair action. In this case, the server may generate an instruction to repair the road defect at a particular location. A road characteristic such as an obstacle in the road may correspond to a removal action and/or an avoidance action.

The server 106 may identify a recipient for the instruction. The server 106 may classify the action to determine the recipient. The recipient may be an entity, a computing device of that entity, a person, a computing device of that person, and/or any other similar recipient. Some instructions may correspond to multiple recipients. The server 106 may select the recipients for an instruction based on the classification of the instruction. For example, a repair action may correspond to a government entity. A removal action may correspond to a government entity and/or a computing device in the vicinity of the road characteristic. An avoidance action may correspond to a computing device in the vicinity of the road characteristic and/or computing device that is configured to generate navigation instructions.

In some implementations, the server 106 may request additional information from a passenger of the vehicle 104 or other user. The server 106 may request to confirm the location of the road characteristic and/or request additional information related to any other nearby road characteristics. The user may provide details related to an appropriate action to address the road characteristic. The user may confirm the selected action as appropriate.

The server 106 provides, for output, the instruction to perform the action (440). The server 106 transmits the instruction to a computing device that corresponds to the recipient. In some implementations, the instruction may include a timeline to address the road characteristic in the case of a repair or removal instruction. In some implementations, the instruction may include a timeline to continue following the instruction in the case of an avoidance instruction. In some implementations, the server 106 may receive a request for navigation instructions and may generate instructions that avoid the road characteristic even if that road may have been part of the selected route.

In some implementations, the server 106 may analyze additional data that reflects characteristics of a vehicle and determine that the road characteristic has been addressed. In this case, the server 106 may transmit updated information to the recipients indicating that the road characteristic has been addressed. For example, the recipient of an avoidance instruction may no longer generate navigation instructions to avoid the road characteristic. As another example, the recipient of a repair instruction may have repaired the road characteristic or may no longer have to repair the road characteristic as may be the case if an obstacle was removed by another party.

Figure 5:
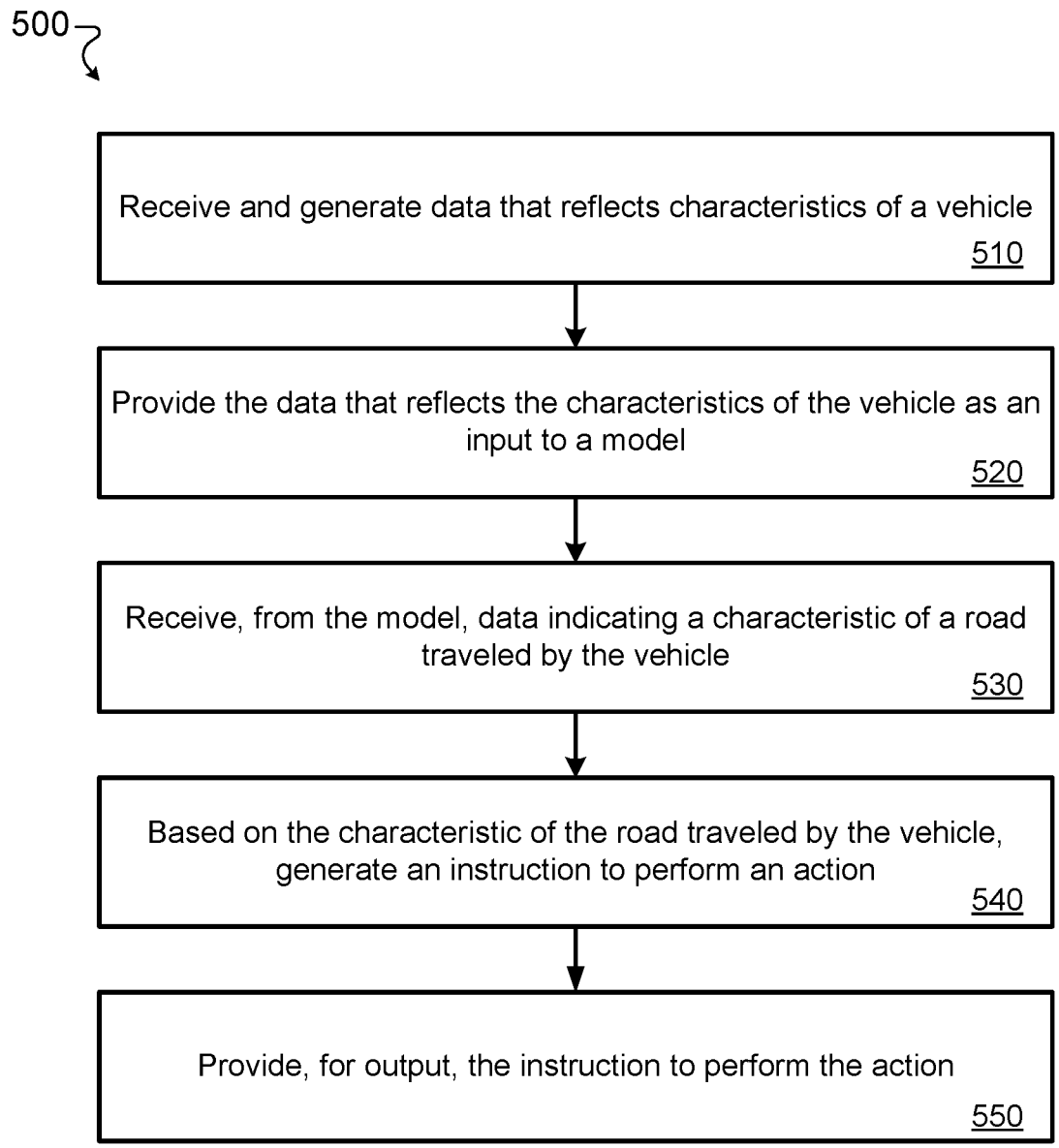

FIG. 5 is a flowchart of example process 500 for detecting the condition of a road and generating an instruction based on that condition. In general, the process 500 receives data from a vehicle and generates data based on the movements of the vehicle. Based on that data, the process determines a characteristic of the road that the vehicle traveled. The process 500 outputs an instruction based on that characteristic of the road. The process 500 will be described as being performed by the computing device 300 of FIG. 3 and will include references to other components in FIGS. 1 and 3. The process 500 may also be performed by the computing device 108 of FIG. 1.

The computing device 300 receives and generates data that reflects characteristics of a vehicle (510). The computing device 300 may include sensors 355 that include accelerometer, a gyroscope, a GPS receiver, a barometer, an ambient light sensor, a camera, a compass, a gravity sensor, a proximity sensor, a magnetometer, a microphone and/or any other similar sensors. The sensors generate sensor data 345. The computing device 300 may also communicate with the vehicle through a communication interface 305 that may include a connector that interfaces with an on-board diagnostic port of the vehicle. The computing device 300 may receive vehicle diagnostic data such as real-time vehicle information (engine revolutions per minute, vehicle speed, spark advance, airflow rate, coolant temperature, tire pressure, airbag status, etc.), status of the check engine light, emission readiness status, diagnostic codes, oxygen sensor results, miles driven, vehicle identification number, and/or any other similar vehicle data. The computing device 300 may store the vehicle data 340.

The computing device 300 provides the data that reflects the characteristics of the vehicle as an input to a model (520). The computing device 300 may analyze the data that reflects the characteristics of the vehicle using one or more road characteristic models and/or road characteristic rules. The road characteristic rules may specify how to compare the data that reflects the characteristics of the vehicle to determine a characteristic over which the vehicle traveled. The road characteristic model may be configured to receive the data that reflects the characteristics of the vehicle and output data a road characteristic.

The computing device 300 receives, from the model, data indicating a characteristic of a road traveled by the vehicle (530). The road characteristic models may be trained using machine learning and historical data. The data samples used to train the road characteristic models may include vehicle data, sensor data, and a label indicating a road characteristic. These data samples may be collected by other computing devices that were located in other vehicles while those vehicles interacted with various road conditions and characteristics, including pavement that did not include a defect, obstacle, or any other similar characteristic. For example, a data sample may include vehicle data, sensor data, and a label indicating a pothole. Another data sample may include vehicle data, sensor data, and label indicating smooth pavement. In some implementations, the computing device 300 may provide the data that reflects the characteristics of the vehicle to a server. The server may provide the data that reflects the characteristics of the vehicle to the model and provide the output of the model to the computing device 300.

Based on the characteristic of the road traveled by the vehicle, the computing device 300 generates an instruction to perform an action (540). The computing device 300 may access actions 350 that specify the actions to perform to correct the road characteristic. In some instances, the road characteristic may not correspond to any actions. This may be the case if the road characteristic indicates smooth pavement. A road characteristic such as a defect in the road may correspond to a repair action. In this case, the server may generate an instruction to repair the road defect at a particular location. A road characteristic such as an obstacle in the road may correspond to a removal action and/or an avoidance action.

The computing device 300 may identify a recipient for the instruction. The computing device 300 may classify the action to determine the recipient. The recipient may be an entity, a computing device of that entity, a person, a computing device of that person, and/or any other similar recipient. Some instructions may correspond to multiple recipients. The computing device 300 may select the recipients for an instruction based on the classification of the instruction. For example, a repair action may correspond to a government entity. A removal action may correspond to a government entity and/or a computing device in the vicinity of the road characteristic. An avoidance action may correspond to a computing device in the vicinity of the road characteristic and/or computing device that is configured to generate navigation instructions.

In some implementations, the computing device 300 may request additional information from a passenger of the vehicle 104 or other user. The computing device 300 may request to confirm the location of the road characteristic and/or request additional information related to any other nearby road characteristics. The user may provide details related to an appropriate action to address the road characteristic. The user may confirm the selected action as appropriate.

The computing device 300 provides, for output, the instruction to perform the action (550). The computing device 300 transmits the instruction to a computing device that corresponds to the recipient. In some implementations, the instruction may include a timeline to address the road characteristic in the case of a repair or removal instruction. In some implementations, the instruction may include a timeline to continue following the instruction in the case of an avoidance instruction. In some implementations, the computing device 300 may receive a request for navigation instructions and may generate instructions that avoid the road characteristic even if that road may have been part of the selected route.

In some implementations, the computing device 300 may analyze additional data that reflects characteristics of a vehicle and determine that the road characteristic has been addressed. In this case, the computing device 300 may transmit updated information to the recipients indicating that the road characteristic has been addressed. For example, the recipient of an avoidance instruction may no longer generate navigation instructions to avoid the road characteristic. As another example, the recipient of a repair instruction may have repaired the road characteristic or may no longer have to repair the road characteristic as may be the case if an obstacle was removed by another party.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
    receiving, by a first vehicle of a group of vehicles that includes the first vehicle and a second vehicle, data that reflects characteristics of the first vehicle;
    based on the data that reflects the characteristics of the first vehicle, determining, by the first vehicle, a characteristic of a road traveled by the first vehicle;
    determining, by the first vehicle, that a computing device is in a vicinity of the characteristic of the road;
    based on determining that the computing device is in the vicinity of the characteristic of the road, providing, for output by the first vehicle and to the computing device, a request for additional data related to the road;
    receiving, by the first vehicle and from the computing device, the additional data related to the road;
    based on the characteristic of the road traveled by the first vehicle and on the additional data related to the road, generating, by the first vehicle, an instruction for the second vehicle to avoid a location of the characteristic of the road; and
    providing, for output by the first vehicle and to the second vehicle, the instruction for the second vehicle to avoid the location of the characteristic of the road,
    wherein the second vehicle (i) receives the instruction for the second vehicle to avoid the location of the characteristic of the road and (ii) generates an additional instruction to avoid the location of the characteristic of the road.

2. The method of claim 1, wherein the first vehicle includes an additional computing device that is connected to an on-board diagnostic port of the vehicle.

3. The method of claim 1, wherein the data that reflects the characteristics of the first vehicle comprises:
    speed data, location data, braking data, engine temperature data, tire pressure data, engine speed data, accelerometer data, gyroscope data, magnetometer data, and gravity sensor data.

4. The method of claim 1, comprising:
    receiving, from a mobile device of a passenger of the first vehicle, mobile device data,
    wherein the characteristic of the road traveled by the first vehicle is further based on the mobile device data.

5. The method of claim 1, wherein determining the characteristic of the road traveled by the first vehicle comprises:
    providing the data that reflects characteristics of the first vehicle as an input to a model; and
    receiving, from the model, data indicating the characteristic of the road traveled by the first vehicle.

6. The method of claim 1, wherein the characteristic of the road comprises an obstacle in the road.

7. The method of claim 1, comprising:
    determining an additional location of a defect in the road;
    generating an additional instruction to repair the defect at the additional location in the road; and
    providing, for output by the first vehicle, the additional instruction to repair the defect at the additional location in the road.

8. The method of claim 1, comprising:
    receiving weather data,
    wherein the characteristic of the road traveled by the first vehicle is further based on the weather data.

9. The method of claim 1, comprising:
    receiving, by the first vehicle, a request for navigation directions;
    based on the characteristic of the road traveled by the first vehicle, generate the navigation directions; and
    provide, for output, the navigation directions.

10. The method of claim 1, comprising:
    determining, by the first vehicle, that the characteristic of the road has been corrected;

based on determining that the characteristic of the road has been corrected, generating, by the first vehicle, another instruction for the second vehicle to cease avoiding the location of the characteristic of the road; and providing, for output by the first vehicle and to the second vehicle, the other instruction for the second vehicle to cease avoiding the location of the characteristic of the road, wherein the second vehicle (i) receives the other instruction for the second vehicle to cease avoiding the location of the characteristic of the road and (ii) generates an additional other instruction to navigate along a route that includes the location of the characteristic of the road.

11. A first vehicle, comprising:
one or more processors; and
memory including a plurality of computer-executable components that are executable by the one or more processors to perform a plurality of actions, the plurality of acts comprising:
receiving, by the first vehicle of a group of vehicles that includes the first vehicle and a second vehicle, data that reflects characteristics of the first vehicle;
based on the data that reflects the characteristics of the first vehicle, determining, by the first vehicle, a characteristic of a road traveled by the first vehicle;
determining, by the first vehicle, that a computing device is in a vicinity of the characteristic of the road;
based on determining that the computing device is in the vicinity of the characteristic of the road, providing, for output by the first vehicle and to the computing device, a request for additional data related to the road;
receiving, by the first vehicle and from the computing device, the additional data related to the road;
based on the characteristic of the road traveled by the first vehicle and on the additional data related to the road, generating, by the first vehicle, an instruction for the second vehicle to avoid a location of the characteristic of the road; and
providing, for output by the first vehicle and to the second vehicle, the instruction for the second vehicle to avoid the location of the characteristic of the road,
wherein the second vehicle (i) receives the instruction for the second vehicle to avoid the location of the characteristic of the road and (ii) generates an additional instruction to avoid the location of the characteristic of the road.

12. The first vehicle of claim 11, comprising an additional computing device that is connected to an on-board diagnostic port of the vehicle.

13. The first vehicle of claim 11, wherein the data that reflects the characteristics of the first vehicle comprises:
speed data, location data, braking data, engine temperature data, tire pressure data, engine speed data, accelerometer data, gyroscope data, magnetometer data, and gravity sensor data.

14. The first vehicle of claim 11, wherein the plurality of acts comprise:
receiving, from a mobile device of a passenger of the first vehicle, mobile device data,
wherein the characteristic of the road traveled by the first vehicle is further based on the mobile device data.

15. The first vehicle of claim 11, wherein determining the characteristic of the road traveled by the vehicle comprises:
providing the data that reflects characteristics of the first vehicle as an input to a model; and
receiving, from the model, data indicating the characteristic of the road traveled by the first vehicle.

16. The first vehicle of claim 11, wherein the characteristic of the road comprises an obstacle in the road.

17. The first vehicle of claim 11, wherein the plurality of acts comprise:
determining an additional location of a defect in the road;
generating an additional instruction to repair the defect at the additional location in the road; and
providing, for output by the first vehicle, the additional instruction to repair the defect at the additional location in the road.

18. The first vehicle of claim 11, wherein the plurality of acts comprise:
receiving, by the first vehicle, a request for navigation directions;
based on the characteristic of the road traveled by the first vehicle, generate the navigation directions; and
provide, for output, the navigation directions.

19. One or more non-transitory computer-readable media of a first vehicle storing computer-executable instructions that upon execution cause the first vehicle to perform acts comprising:
receiving, by the first vehicle of a group of vehicles that includes the first vehicle and a second vehicle, data that reflects characteristics of first vehicle;
based on the data that reflects the characteristics of the first vehicle, determining, by the first vehicle, a characteristic of a road traveled by the first vehicle;
determining, by the first vehicle, that a computing device is in a vicinity of the characteristic of the road;
based on determining that the computing device is in the vicinity of the characteristic of the road, providing, for output by the first vehicle and to the computing device, a request for additional data related to the road;
receiving, by the first vehicle and from the computing device, the additional data related to the road;
based on the characteristic of the road traveled by the first vehicle and on the additional data related to the road, generating, by the first vehicle, an instruction for the second vehicle to avoid a location of the characteristic of the road; and
providing, for output by the first vehicle and to the second vehicle, the instruction for the second vehicle to avoid the location of the characteristic of the road,
wherein the second vehicle (i) receives the instruction for the second vehicle to avoid the location of the characteristic of the road and (ii) generates an additional instruction to avoid the location of the characteristic of the road.

* * * * *